No. 756,125. PATENTED MAR. 29, 1904.
W. D. LLOYD.
WEEDING MACHINE.
APPLICATION FILED JUNE 18, 1903.
NO MODEL. 2 SHEETS—SHEET 2.

Witnesses
George Hilton

Inventor
William D. Lloyd,
By H. B. Wilson
Attorney

No. 756,125.

Patented March 29, 1904.

UNITED STATES PATENT OFFICE.

WILLIAM DANIEL LLOYD, OF FISKVILLE, TEXAS, ASSIGNOR OF ONE-HALF TO E. L. STECK, OF AUSTIN, TEXAS.

WEEDING-MACHINE.

SPECIFICATION forming part of Letters Patent No. 756,125, dated March 29, 1904.

Application filed June 18, 1903. Serial No. 162,118. (No model.)

*To all whom it may concern:*

Be it known that I, WILLIAM DANIEL LLOYD, a citizen of the United States, residing at Fiskville, in the county of Travis and State of Texas, have invented certain new and useful Improvements in Weeding-Machines; and I do declare the following to be a full, clear, and exact description of the invention, such as will enable others skilled in the art to which it appertains to make and use the same.

My invention relates to improvements in weeding-machines adapted effectually to destroy weeds from each side of a row or drill of corn, cotton, or any other crop, to remove foreign matter from proximity to the rows or drills, and deposit and remove material, together with the destroyed weeds, to the centers of the spaces between the rows or drills; and it consists in the peculiar construction and combination of devices hereinafter described and claimed.

This invention is an improvement on the weeder for which Letters Patent of the United States, No. 693,286, were granted to me February 11, 1902.

Figure 1:
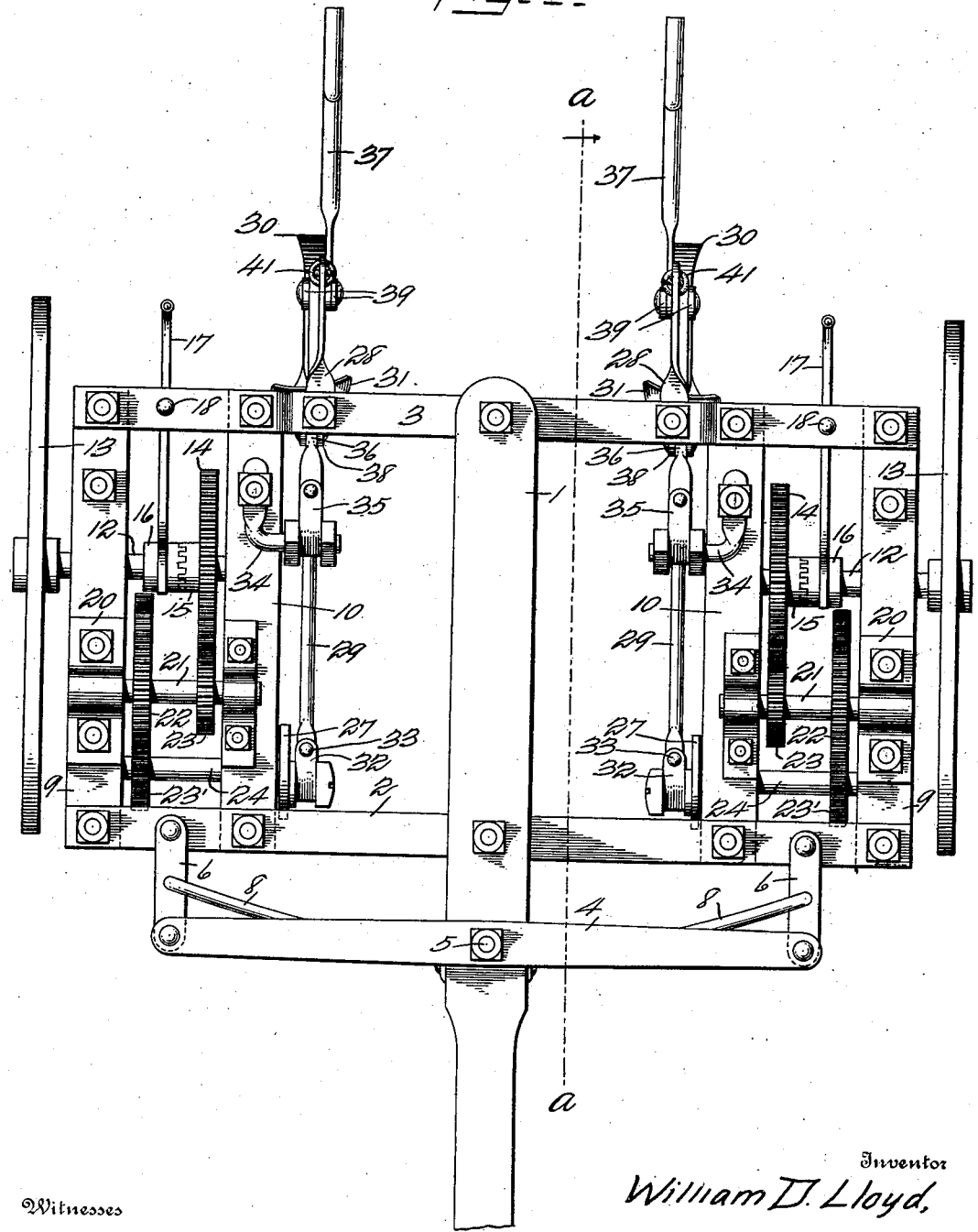
Figure 2:
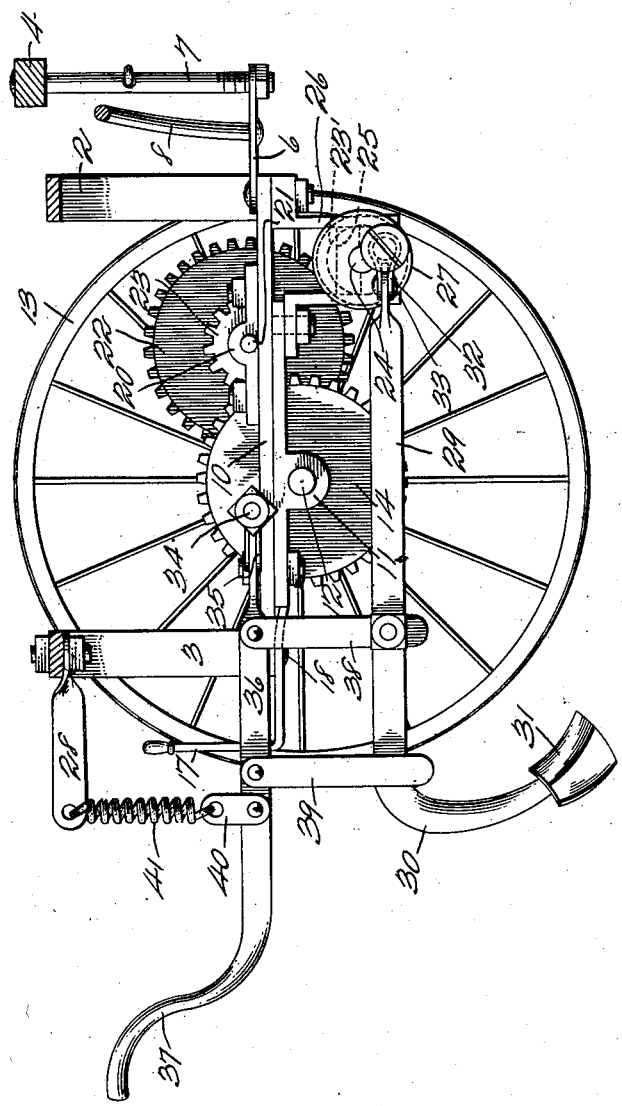

In the accompanying drawings, Figure 1 is a top plan view of a weeding-machine embodying my improvements. Fig. 2 is a longitudinal sectional view of the same, taken on the plane indicated by the line *a a* of Fig. 1.

To the rear portion of the draft tongue or pole 1 are attached a pair of transversely-disposed arch-bars 2 3, the latter being in rear of the former. A cross-bar 4 is secured by the bolt 5 on the upper side of the tongue or pole 1 at a suitable distance in advance of the arch-bar 2, and its ends are connected to the front ends of links 6, which project forwardly from the front arch-bar 2, by draft-rods 7, the latter serving for the attachment of the swingletrees. Rods 8 connect the pole or tongue to the said links, as shown. The outwardly-projecting end portions of the arch-bars 2 3 are connected together by longitudinally-disposed bars 9 10. Said bars are provided on their under sides with bearings 11 for shafts 12, to each of which at its outer end is attached a driving and supporting wheel 13. On each of said shafts at a point between said bars 9 10 is a loosely-mounted spur-gear 14, provided on one side with a clutch member 15. Splined on each of said shafts is a clutch member 16, which is engaged by a shifting-lever 17, said shifting-levers being pivotally connected to the end portions of the arch-bar 3, as at 18, and serving to move the clutch members 16 into and out of engagement with the clutch members 15, and hence enabling the spur-gears 14 to be locked to the said shafts 12 at will, so that they may be caused to rotate with said shafts when the machine is in motion or thrown out of engagement at will. On the upper sides of the bars 9 10 are bearings 20, in which are journaled shafts 21. On each of said shafts is a gear-wheel 22 and a pinion 23. The latter are engaged by the gears 14. The former engage pinions 23 on shafts 24, which shafts 24 are journaled in bearings 25, carried by brackets 26, which are bolted to and depend from the bars 9 10 and the front yoke-bar 2. At the inner ends of said shafts are cranks 27.

A pair of bracket-arms 28 are secured to and project rearwardly from the arched portion of the rear arch-bar 3. A pair of beams 29, which are provided at their rear ends with standards 30, that carry weed-destroying hoes or implements 31, have their front ends connected to the wrists of the cranks by means of straps 32, the front ends of the said beams being pivotally connected to the said wrists for lateral angular movement, as at 33. Supporting-pivots 34, which are here shown as bracket-arms bolted to the upper sides of the bars 10 and projecting inwardly therefrom, form connections for straps 35, to which are pivotally connected for lateral angular movement the front ends of a pair of levers 36. Said levers have rearwardly-extending handles 37 and are connected to the beams by means of links 38 39. The former are pivotally connected to the levers and to the beams. The links 39 are connected to the levers and extend downwardly on opposite sides of the beams and form vertical guides therefor. It will be understood that the pivotal connection effected between the front ends of the beams and the wrists of the cranks by the straps enables the beams to be moved angularly in a vertical direction to raise and lower the weed-destroying implements 31, and it will be further understood that when the machine is in operation the rotary motion of the cranks to which the beams are connected and the link connections between the beams and the levers cause the beams and the weed-chopping devices carried thereby to describe reciprocatory motion, which causes the weed-chopping devices to enter, stir, and leave the ground in rapid succession, and thereby effectually dig up, chop, and destroy the weeds in proximity to the rows of the growing plants. The said weed-chopping implemements operate at and slightly below the surface of the earth, and this enables the machine to be used for destroying the weeds at times when the ground is too wet to permit of its cultivation by cultivators of the usual construction. Hence my improved weeding-machine is efficient in preventing the crop from being choked out by rapidly-growing weeds during wet seasons and effectually obviates the necessity for manual hoeing of the crop.

It will be understood that by disconnecting the driving-gears on the shafts 12 from the clutch elements splined on said shafts the operation of the weed-destroying devices will be permitted.

The handles with which the levers 36 are provided and the pivotal connections at the front ends of said levers and the front ends of the beams enable the latter to be moved laterally, as may be required by the plowman or operator of the machine, so as to cause the weed-destroying devices to operate under all conditions close to and parallel with the rows or drills of the growing plants. Extensible link devices 40, which include coil-extensile springs 41, connect the rear portions of the levers 36 to bracket-arms 28 and normally raise the rear ends of said levers, and hence the beams also, to cause the weed-destroying implements carried by the said beams to be raised above the earth. By depressing the rear ends of the said levers 36, which may be readily done by the handles with which they are provided, the rear ends of the beams may be also depressed to lower the weed-destroying implements and cause them to operate in the earth.

Having thus fully described my invention, what I claim as new, and desire to secure by Letters Patent, is—

1. In a machine of the class described, the combination of a lever mounted for vertical and horizontal angular movement, with a crank, an implement having a beam connected to the crank for angular movement, links pivotally connected to the lever and the beam whereby the latter is adapted for reciprocatory rotary movement, and a guide element independent of the links to keep the beam and lever in alinement with each other, substantially as described.

2. In a weeder of the class described, the combination of a crank-shaft, an implement having a beam connected to the crank of said shaft for lateral movement, a lever adapted for lateral and horizontal angular movement, a link pivotally connected to said lever and said beam, a drive-shaft, a gear loosely mounted thereon, a clutch splined on the drive-shaft and adapted to be engaged and disengaged with the gear, a lever to shift the clutch, a counter-shaft having gears, one of which engages the first-mentioned gear, and a gear on the crank-shaft engaged with one of the gears on the counter-shaft, substantially as described.

In testimony whereof I have hereunto set my hand in presence of two subscribing witnesses.

WILLIAM DANIEL LLOYD.

Witnesses:
C. J. BÖET,
LEE DAWSON.